July 21 1925.  
D. LEVIN  
1,546,934

GUIDE APPARATUS FOR FABRIC CUTTING MACHINES

Filed Sept. 22, 1924   2 Sheets-Sheet 1

INVENTOR  
David Levin  
BY  
ATTORNEY

July 21 1925.  
D. LEVIN  
1,546,934
GUIDE APPARATUS FOR FABRIC CUTTING MACHINES
Filed Sept. 22, 1924  2 Sheets-Sheet 2
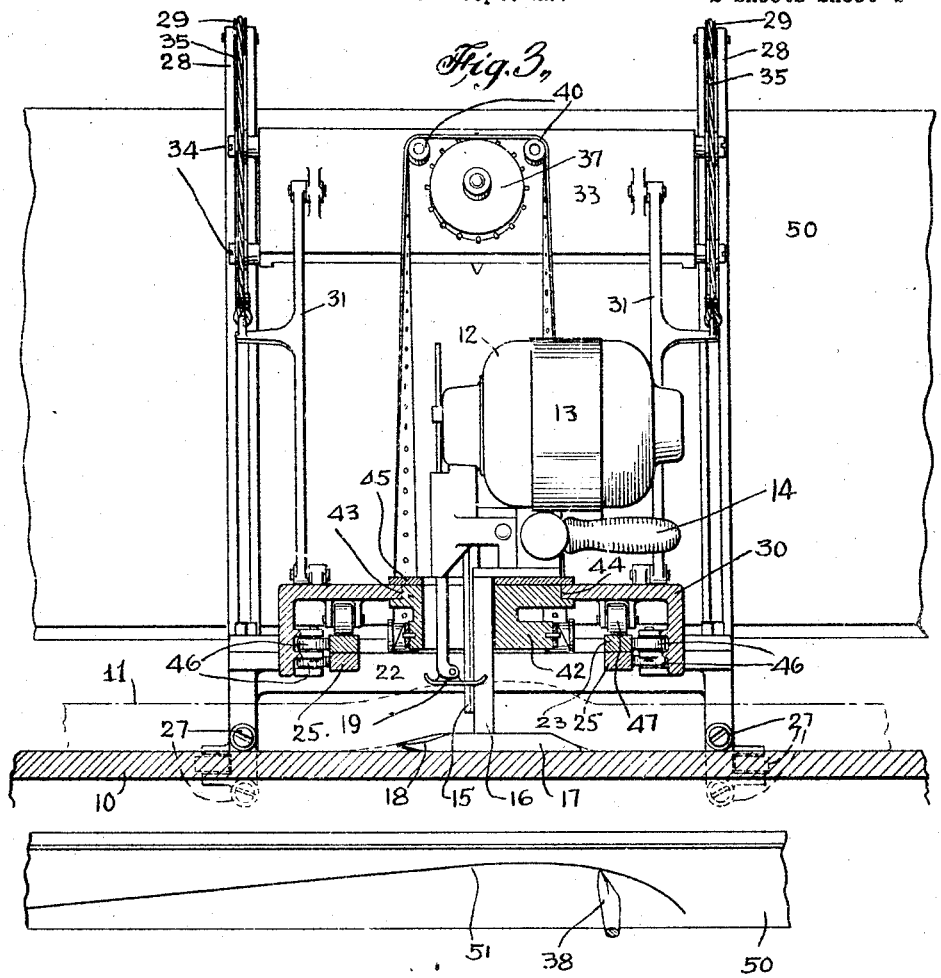
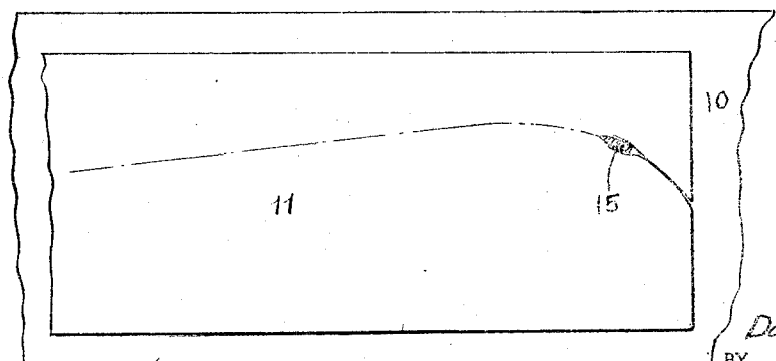
INVENTOR
David Levin
BY
ATTORNEY Patented July 21, 1925.

1,546,934

UNITED STATES PATENT OFFICE.

DAVID LEVIN, OF BROOKLYN, NEW YORK.

GUIDE APPARATUS FOR FABRIC-CUTTING MACHINES.

Application filed September 22, 1924. Serial No. 739,017.

*To all whom it may concern:*

Be it known that I, DAVID LEVIN, a citizen of the United States, and residing at Brooklyn, in the county of Kings and State of New York, have invented certain new and useful Improvements in Guide Apparatus for Fabric-Cutting Machines, of which the following is a specification, such as will enable those skilled in the art to which it appertains to make and use the same.

This invention relates to apparatus for use in connection with fabric cutting machines of different kinds and classes whereby a lay of fabric of a predetermined number of plies may be cut in an accurate, simple and efficient manner; and the object of the invention is to provide an apparatus of which a pattern supporting board constitutes a part whereby a cutting machine may be accurately guided over a lay of fabric to cut out garment parts therefrom and whereby the guidance of the machine is controlled by the pattern supporting board of the apparatus; a further object of the invention being to provide an apparatus of the class specified which may be mounted in connection with a table on which the lay of fabric is placed, means being provided to adjust the apparatus to tables of different sizes and further to the provision of means for permitting the free movement of the apparatus or part thereof longitudinally of the table; a further object being to provide means for movably supporting a cutting machine in connection with the movable part of the apparatus; a further object being to provide a tracing element movably disposed with reference to a stationary pattern supporting part of the apparatus and with means for transmitting the movement of said element to a cutting machine movably mounted in and with the movable part of the apparatus; and with these and other objects in view, the invention consists in an apparatus of the class and for the purpose specified, which is simple in construction, efficient in use and which is constructed as hereinafter described and claimed.

The invention is fully disclosed in the following specification, of which the accompanying drawing forms a part, in which the separate parts of my improvement are designated by suitable reference characters in each of the views, and in which:—

Fig. 3 is a partial section on the line 3—3 of Fig. 1; and,

Fig. 4 is a diagrammatic view illustrating the relative operation of the tracing element and cutter blade.

Figure 1:
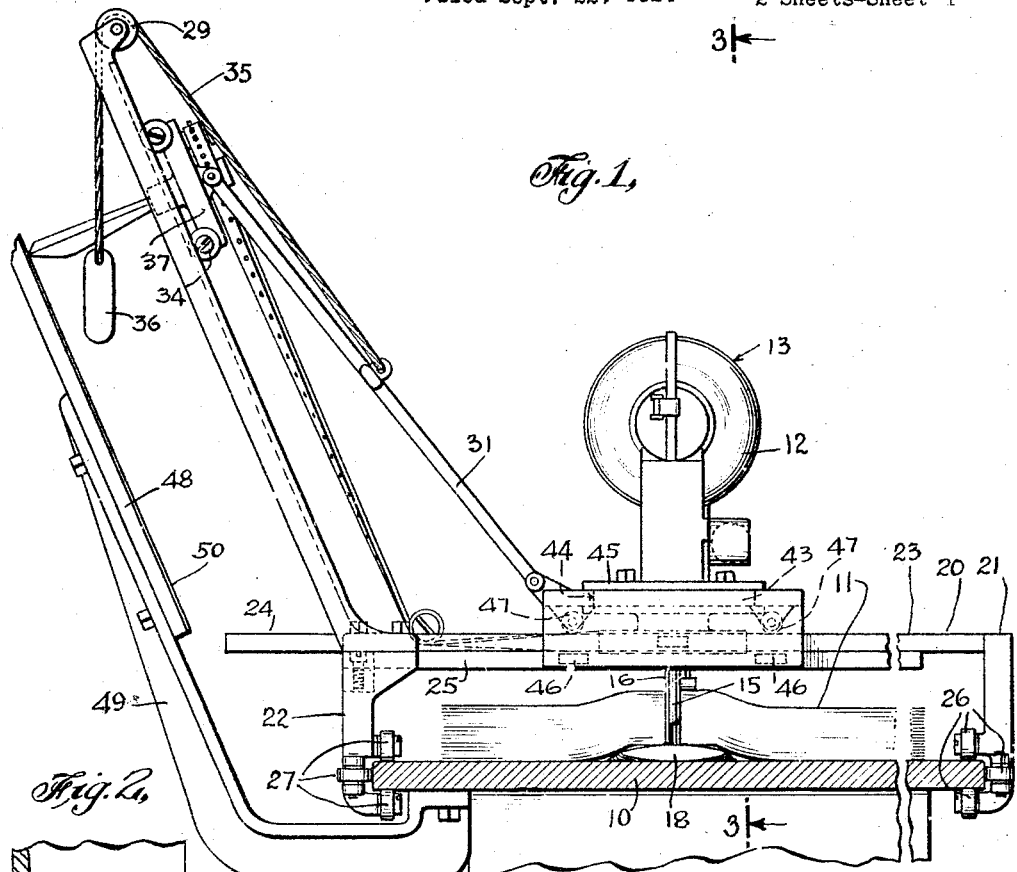
Fig. 1 is a side view of my apparatus, indicating the method of its use and with part of the construction broken away.
Figure 2:
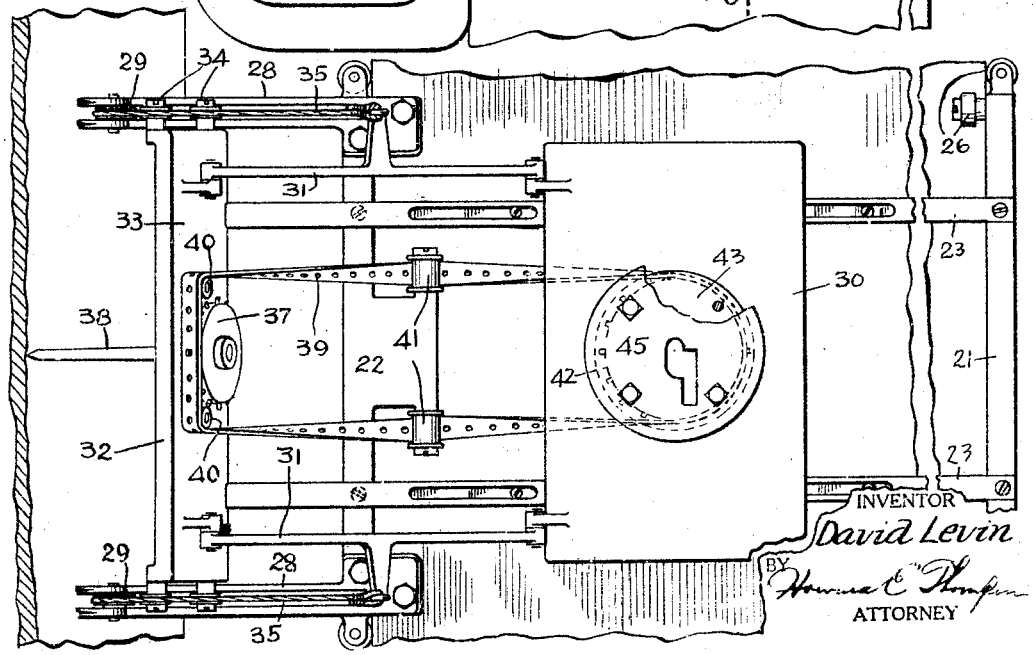
Fig. 2 is a plan view of the construction shown in Fig. 1, with parts omitted.

In the drawing I have shown for the purpose of illustrating one use of my invention a workpiece table 10 commonly employed in tailoring establishments and on which a lay of suitable fabric 11, from which garment parts are adapted to be cut, is placed, said lay being composed of any desired number of sheets of fabric mounted on the table 10 in accordance with the usual practice. At 12, I have shown a cutting machine of conventional type, said machine in the construction shown comprising an electric motor body 13, handle member 14, cutter blade 15, reciprocating upwardly and downwardly by the motor and operating in a guide and guard 16, at the lower end of which is a base 17 adapted to travel over the table 10, and one end of which is tapered as shown at 18 to facilitate the lifting of the lay of fabric and the passage of the base 17 therebeneath, and at 19 I have shown the usual presser-foot for retaining the fabric, in juxtaposition to the cutter blade 15, in proper position.

In carrying my invention into effect, I provide a carriage 20 which is adapted to be mounted on and movable longitudinally of the table 10, said carriage comprising front and rear frame members 21 and 22 coupled together and adjustable relatively to each other by side rails 23, each of said rails composed of top and bottom parts 24 and 25 adjustable relatively to each other, to properly space the frames 21 and 22.

The frames 21 and 22 are provided at the side portions thereof with guide rollers arranged in sets of three, 26 and 27 respectively, and each set of rollers engages the top and bottom face as well as the side edge of the table 10 to retain the carriage 20 or the frames 21 and 22 thereof in proper position and permitting of the free movement of said carriage relatively to the table.

Secured to the frame 21 are upwardly and backwardly directed tracks 28 arranged in parallel relation and provided at their upper ends with pulleys 29, and mounted on and movable longitudinally of the rails 23 and transversely of the carriage 20 is a supplemental carriage 30 in connection with which the cutting machine 12 is adapted to be mounted. Coupled with the supplemental carriage 30 by links 31 is a tracing member 32 comprising in the construction shown, a plate 33 provided at its ends with rollers 34 adapted to move relatively to the tracks 28, and cords or cables 35 are connected with the links 31 and pass around the pulleys 29 and provided at their ends with weights 36 to counterbalance the member 32 in the operation of the apparatus.

Rotatably mounted centrally of the plate 33 of the member 32 is a toothed wheel 37 centrally of the axis of which is arranged a backwardly directed tracing finger 38 adapted to be moved into different angular positions in the rotation of said wheel 37. The wheel 37 is rotated by a belt 39 having spaced apertures therein adapted to receive the teeth of the wheel 37, said belt passing around pulleys 40 disposed at the opposite sides of the wheel 37 and mounted on the plate 33, around other pulleys 41 mounted in connection with the frame 22 and then around a toothed wheel 42 mounted in connection with the cutting machine 12 or the tool guide and guard 16 thereof.

The wheel 42 in the construction shown is provided on its upper face with a flanged circular bearing portion 43 which passes into and operates in a circular aperture 44 in the top plate of the supplemental carriage 30, and a removable plate 45 retains the bearing 43 in proper position on the supplemental carriage 30 and also serves to support the cutting machine 12 thereon but permitting of the rotary movement of the machine in said carriage, it being understood that the rotary movement of the cutting machine is transmitted to the tracing finger 38 through the belt 39.

Mounted in connection with each side of the supplemental carriage 30 are two sets of guide rollers 46 adapted to engage the outer faces of the rails 23 or the separate members 24 and 25 thereof, and other rollers 47 are mounted in connection with the supplemental carriage 30 and operate upon the top face of the rails 23. This construction serves to support and guide the supplemental carriage in its movement on the rails 23 in the operation of the machine.

A pattern supporting table 48 is mounted in connection with the table 10 or any other suitable stationary support by a bracket or brackets 49 so constructed as to maintain the table 48, at all times, in parallel relation to the tracks 28 as clearly shown in Fig. 1 of the drawing and the patterns of predetermined garments are applied or marked on sheets of paper or the like 50 which is attached to the front face of the table 48 in a position to suit the lay 11 of the fabric. It will be understood that the tracing finger 38 is movable relatively to the markings 51 on the sheet 50 as diagrammatically illustrated in Fig. 4 of the drawing, and in this movement the cutter blade 15 or the cutting edge thereof is correspondingly moved relatively to the lay of fabric, it being understood that the pointed end of the tracing finger 38 be on a center arranged in common alinement transversely of the table 10 with reference to the cutting edge of the blade 15 or in other words, the axis of the member 43 should correspond with the axis of the member 37, the tracing finger 38 representing on the pattern sheet 50 the blade of the cutting machine 12.

The operation of the machine will be readily understood from the foregoing description when taken in connection with the accompanying drawings and the following statement. In the use of my improved machine, the carriage 20 or main carriage is positioned at one end of the table 10 and the lay of fabric 11 is placed upon the table and a pattern sheet is applied to the table 48 in position to correspond with the lay of the fabric on the table 10 or the lay of the fabric is positioned to correspond with the arrangement of the pattern piece 50 on which the patterns representing the garment parts to be cut from the fabric lay, are arranged. The base member 17 of the cutter machine is then placed under one edge portion of the lay of fabric to be cut by suitably manipulating the carriage 20 on the table 10 and the supplemental carriage 30 on the tracks 23, the tracing finger 38 serving to guide the placement of the several parts in this operation, and when the apparatus has been placed to properly start the cutting operation, the cutting machine 12 is put into operation in the usual manner and by grasping the handle 14 of the machine and moving the tracing finger 38 over the markings on the pattern sheet 50, which result is accomplished by manipulating the carriage 20 longitudinally of the table 10 and the carriage 30 transversely of the table 10 and longitudinally of the rails 23 and in the first named movement, the finger 38 is moved with the carriage 20 and in the second named operation, said finger is moved relatively to the carriage or upwardly and downwardly over the table 48. It will be understood that the movement of the supplemental carriage 30 is transmitted to the tracing member 32 through the links 31 and the member 32 is counterbalanced by the weights 36.

In the above operation, the cutting edge of the blade 15 of the cutting machine 12 is properly directed relatively to the lay of fabric by rotating said machine in the supplemental frame 30 on the bearing 43, which rotary operation is transmitted to the tracing finger 38 through the belt 39 as will be apparent. In other words, the proper guiding of the tracing finger 38 over the markings on the pattern piece 50 will accurately guide the cutter blade of the cutting machine over the workpiece or lay of fabric to cut therefrom accurate garment parts from the patterns laid out on the sheet 50.

It will be understood that with my improved apparatus, patterns of garment parts may be accurately laid out upon a pattern sheet and mounted upon the table 48 and any desired number of lays of fabric may be accurately cut by the use of a single pattern sheet especially in the production of numerous garments of a given size, it being understood that new pattern sheets for different size garments or for garments of totally different character may be mounted on the table 48 at will. It will also be understood that the apparatus is designed for use in cutting garment parts of any kind or class, the apparatus avoiding the necessity of marking out on the lay of fabric the patterns of the garment parts to be cut therefrom in accordance with the present methods of procedure. It will also be apparent that my apparatus is adapted for use in cutting garment parts from lays of fabric of different widths, the main carriage of the machine being adjustable to suit the widths of tables now in use while the tracks 28 and table 48 will be preferably constructed to suit and care for tables or work benches of the greatest widths, and while I have shown and described certain details of construction for carrying my invention into effect and have illustrated the use of one conventional type of cutting machine, I am not necessarily limited in these respects, and various changes in and modifications of the construction herein shown and described may be made within the scope of the appended claims without departing from the spirit of my invention or sacrificing its advantages.

Having fully described my invention, what I claim as new and desire to secure by Letters Patent, is:—

1. An apparatus of the class described comprising a main carriage, a supplemental carriage movable relatively at right angles to the main carriage and therewith, means for supporting a cutting machine in connection with the supplemental carriage, and a tracing element in operative connection with the main and supplemental carriages.

2. An apparatus of the class described comprising a main carriage, a supplemental carriage movable relatively at right angles to the main carriage and therewith, means for supporting a cutting machine in connection with the supplemental carriage, a tracing element in operative connection with the main and supplemental carriages, the means for mounting the cutting machine in connection with the supplemental carriage being rotatable, and means for transmitting the rotary movement of said means to said tracing element.

3. An apparatus of the class described comprising a main carriage, a supplemental carriage movable relatively at right angles to the main carriage and therewith, means for supporting a cutting machine in connection with the supplemental carriage, a tracing element in operative connection with the main and supplemental carriages, the means for mounting the cutting machine in connection with the supplemental carriage being rotatable, means for transmitting the rotary movement of said means to said tracing element, and means for conterbalancing said tracing element.

4. An apparatus of the class described comprising a main carriage, a supplemental carriage movable relatively at right angles to the main carriage and therewith, means for supporting a cutting machine in connection with the supplemental carriage, a tracing element in operative connection with the main and supplemental carriages, the means for mounting the cutting machine in connection with the supplemental carriage being rotatable, means for transmitting the rotary movement of said means to said tracing element, means for counterbalancing said tracing element, and means for supporting a pattern piece in juxtaposition to said tracing element and over which said tracing element is movable.

5. An apparatus of the class described comprising a main carriage mounted to move in a given path, a supplemental carriage mounted on and movable with the first named carriage and movable relatively to the first named carriage in a path at right angles to the movement of the main carriage, means for supporting a pattern piece in predetermined position with reference to said movable carriages, and a tracing element in operative connection with said carriages and adapted for universal movement over said pattern piece supporting means.

6. An apparatus of the class described comprising a main carriage mounted to move in a given path, a supplemental carriage mounted on and movable with the first named carriage and movable relatively to the first named carriage in a path at right angles to the movement of the main carriage, means for supporting a pattern piece in predetermined position with reference to said movable carriages, a tracing element in operative connection with said carriages and adapted for universal movement over said pattern piece supporting means, and means for rotatably mounting a cutting machine in connection with said supplemental carriage.

7. An apparatus of the class described comprising a main carriage mounted to move in a given path, a supplemental carriage mounted on and movable with the first named carriage and movable relatively to the first named carriage in a path at right angles to the movement of the main carriage, means for supporting a pattern piece in predetermined position with reference to said movable carriages, a tracing element in operative connection with said carriages and adapted for universal movement over said pattern piece supporting means, means for rotatably mounting a cutting machine in connection with said supplemental carriage, and means for transmitting the rotary movement of said last named means to said tracing element.

8. An apparatus of the class described comprising a main carriage mounted to move in a given path, a supplemental carriage mounted on and movable with the first named carriage and movable relatively to the first named carriage in a path at right angles to the movement of the main carriage, means for supporting a pattern piece in predetermined position with reference to said movable carriages, a tracing element in operative connection with said carriages and adapted for universal movement over said pattern piece supporting means, means for rotatably mounting a cutting machine in connection with said supplemental carriage, means for transmitting the rotary movement of said last named means to said tracing element, and means arranged in parallel relation with reference to the pattern piece supporting means for supporting and guiding said tracing element in its movement.

9. An apparatus of the class described comprising a main carriage mounted to move in a given path, a supplemental carriage mounted on and movable with the first named carriage and movable relatively to the first named carriage in a path at right angles to the movement of the main carriage, means for supporting a pattern piece in predetermined position with reference to said movable carriages, a tracing element in operative connection with said carriages and adapted for universal movement over said pattern piece supporting means, means for rotatably mounting a cutting machine in connection with said supplemental carriage, means for transmitting the rotary movement of said last named means to said tracing element, means arranged in parallel relation with reference to the pattern piece supporting means for supporting and guiding said tracing element in its movement, and means for adjusting the main carriage to supports of different dimensions.

10. An apparatus for guiding a cutter machine over a workbench on which is mounted a lay of fabric comprising a carriage mounted to move longitudinally of said table, a supplemental carriage movable transversely of the table and of said first named carriage and movable with said first named carriage, means for rotatably supporting a cutter machine in said supplemental carriage, and means for guiding the main and supplemental carriages and said cutter machine in their movement over said table and relatively to the lay of fabric thereon.

11. An apparatus for guiding a cutter machine over a workbench on which is mounted a lay of fabric comprising a carriage mounted to move longitudinally of said table, a supplemental carriage movable transversely of the table and of said first named carriage and movable with said first named carriage, means for rotatably supporting a cutter machine in said supplemental carriage, and means for guiding the main and supplemental carriages and said cutter machine in their movement over said table and relatively to the lay of fabric thereon, said last named means being operated by said main and supplemental carriages.

12. An apparatus for guiding a cutter machine over a workbench on which is mounted a lay of fabric comprising a carriage mounted to move longitudinally of said table, a supplemental carriage movable transversely of the table and of said first named carriage and movable with said first named carriage, means for rotatably supporting a cutter machine in said supplemental carriage, and means for guiding the main and supplemental carriages and said cutter machine in their movement over said table and relatively to the lay of fabric thereon, said last named means being operated by said main and supplemental carriages and rotated by the cutting machine supporting means of said supplemental carriage.

13. An apparatus for guiding a cutter machine over a workbench on which is mounted a lay of fabric comprising a carriage mounted to move longitudinally of said table, a supplemental carriage movable transversely of the table and of said first named carriage and movable with said first named carriage, means for rotatably supporting a cutter machine in said supplemental carriage, means for guiding the main and supplemental carriages and said cutter machine in their movement over said table and relatively to the lay of fabric thereon, said last named means being operated by said main and supplemental carriages and rotated by the cutting machine supporting means of said supplemental carriage, and means mounted in predetermined relation with reference to said workpiece supporting table for supporting a pattern piece thereon and in connection with which said guiding means is relatively movable.

14. An apparatus of the class described comprising a carriage composed of adjustably spaced frames, means for supporting said carriage for movement longitudinally of the table, a supplemental carriage movably mounted on the main carriage in a path at right angles to the movement of said first named carriage, rails mounted in connection with the first named carriage, a tracing member movably mounted on said rails, means for coupling said member with said supplemental carriage whereby the movement of the main and supplemental carriages may be imparted to said member, a pattern supporting table mounted in fixed parallel relation with reference to said rails, and a tracing finger on said member adapted to be moved over said table or a pattern piece mounted thereon.

15. An apparatus of the class described comprising a carriage composed of adjustably spaced frames, means for supporting said carriage for movement longitudinally of the table, a supplemental carriage movably mounted on the main carriage in a path at right angles to the movement of said first named carriage, rails mounted in connection with the first named carriage, a tracing member movably mounted on said rails, means for coupling said member with said supplemental carriage whereby the movement of the main and supplemental carriages may be imparted to said member, a pattern supporting table mounted in fixed parallel relation with reference to said rails, a tracing finger on said member adapted to be moved over said table or a pattern piece mounted thereon, and means for rotatably mounting a cutting machine in connection with said supplemental carriage.

16. An apparatus of the class described comprising a carriage composed of adjustably spaced frames, means for supporting said carriage for movement longitudinally of the table, a supplemental carriage movably mounted on the main carriage in a path at right angles to the movement of said first named carriage, rails mounted in connection with the first named carriage, a tracing member movably mounted on said rails, means for coupling said member with said supplemental carriage whereby the movement of the main and supplemental carriages may be imparted to said member, a pattern supporting table mounted in fixed parallel relation with reference to said rails, a tracing finger on said member adapted to be moved over said table or a pattern piece mounted thereon, means for rotatably mounting a cutting machine in connection with said supplemental carriage, and means for transmitting the rotary movement of said last named means to said tracing finger.

In testimony that I claim the foregoing as my invention I have signed my name this 18th day of Sept. 1924.

DAVID LEVIN.